(12) United States Patent
Klische (10) Patent No.: US 11,194,562 B2
(45) Date of Patent: Dec. 7, 2021

(54) METHOD AND SYSTEM FOR HARDWARE IDENTIFICATION AND SOFTWARE UPDATE CONTROL

(71) Applicant: BlackBerry Limited, Waterloo (CA)

(72) Inventor: Marcus Klische, Dorfen (DE)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 15/599,917

(22) Filed: May 19, 2017

(65) Prior Publication Data

US 2018/0336024 A1 Nov. 22, 2018

(51) Int. Cl.
| | | |
|---|---|---|
| *G06F 9/44* | (2018.01) | |
| *G06F 9/445* | (2018.01) | |
| *G06F 9/455* | (2018.01) | |
| *G06F 8/65* | (2018.01) | |
| *G06F 21/44* | (2013.01) | |
| *H04L 29/06* | (2006.01) | |
| *G06F 21/57* | (2013.01) | |
| *H04L 9/32* | (2006.01) | |
| *H04L 9/08* | (2006.01) | |
| *H04L 9/30* | (2006.01) | |

(52) U.S. Cl.
CPC ............... *G06F 8/65* (2013.01); *G06F 21/44* (2013.01); *G06F 21/572* (2013.01); *H04L 9/0891* (2013.01); *H04L 9/30* (2013.01); *H04L 9/3247* (2013.01); *H04L 9/3263* (2013.01); *H04L 63/126* (2013.01)

(58) Field of Classification Search
CPC .......... G06F 8/65; G06F 21/44; G06F 21/572; H04L 9/30; H04L 9/3247; H04L 9/3263; H04L 9/0891; H04L 63/126
See application file for complete search history.

(56) References Cited

U.S. PATENT DOCUMENTS 5,875,247 A * 2/1999 Nakashima ........... G06F 21/121
380/281
6,212,635 B1 * 4/2001 Reardon ................. G06F 21/34
380/30

(Continued)

FOREIGN PATENT DOCUMENTS

| CN | 106886424 A | * | 6/2017 |
| WO | 2017006862 A1 | | 1/2017 |

OTHER PUBLICATIONS

Philipp Mundhenk, Security in Automotive Networks: Lightweight Authentication and Authorization, 2016, pp. 1-25. https://dl.acm.org/doi/abs/10.1145/2960407 (Year: 2016).*

(Continued)

*Primary Examiner* — Mongbao Nguyen
(74) *Attorney, Agent, or Firm* — Moffat & Co (57) ABSTRACT

A method at a domain controller for software update control, the method including receiving, at the domain controller, a software update package; verifying, at the domain controller, a source of the software update package; unbundling the software update package into at least one software update, each of the at least one software update being destined for a control unit managed by the domain controller; signing each of the at least one software update; and forwarding each signed software update to the control unit for which the software update is destined.

11 Claims, 9 Drawing Sheets

(56) References Cited

U.S. PATENT DOCUMENTS

| | | | |
|---|---|---|---|
| 7,131,005 B2 | 10/2006 | Levenson et al. | |
| 8,560,823 B1* | 10/2013 | Aytek | G06F 8/654 |
| | | | 713/2 |
| 8,726,265 B2* | 5/2014 | Wang | G06F 21/57 |
| | | | 717/170 |
| 8,966,248 B2 | 2/2015 | Baltes et al. | |
| 9,391,835 B2* | 7/2016 | Aoshima | H04L 41/0654 |
| 9,563,418 B1* | 2/2017 | Walton | G06F 8/65 |
| 10,057,243 B1* | 8/2018 | Kumar | H04W 8/005 |
| 10,313,319 B2* | 6/2019 | Campagna | H04L 9/0637 |
| 2005/0223219 A1* | 10/2005 | Gatto | G07F 17/32 |
| | | | 713/156 |
| 2005/0278716 A1* | 12/2005 | Koppen | G06F 21/121 |
| | | | 717/168 |
| 2006/0242407 A1* | 10/2006 | Kimmel | H04L 9/088 |
| | | | 713/166 |
| 2008/0195868 A1* | 8/2008 | Asokan | G06F 21/64 |
| | | | 713/176 |
| 2009/0119657 A1 | 5/2009 | Link, II | |
| 2009/0260003 A1* | 10/2009 | Matsugashita | G06F 8/64 |
| | | | 717/174 |
| 2010/0040234 A1 | 2/2010 | Alrabady et al. | |
| 2010/0275026 A1* | 10/2010 | Mclean | G06F 21/12 |
| | | | 713/176 |
| 2011/0320089 A1 | 12/2011 | Lewis | |
| 2012/0030470 A1 | 2/2012 | Jdanov et al. | |
| 2012/0072762 A1* | 3/2012 | Atchison | G06F 9/5072 |
| | | | 714/2 |
| 2013/0132936 A1* | 5/2013 | Wang | G06F 8/65 |
| | | | 717/170 |
| 2013/0254756 A1* | 9/2013 | Kroeselberg | G06F 8/65 |
| | | | 717/171 |
| 2014/0052333 A1 | 2/2014 | Mitchell et al. | |
| 2014/0282470 A1* | 9/2014 | Buga | G06F 8/65 |
| | | | 717/170 |
| 2015/0172255 A1* | 6/2015 | Warnez | G06F 8/65 |
| | | | 713/168 |
| 2015/0193221 A1* | 7/2015 | Khan | H04L 67/34 |
| | | | 713/176 |
| 2015/0193224 A1* | 7/2015 | Ziat | G06F 8/65 |
| | | | 717/172 |
| 2015/0220317 A1* | 8/2015 | Li | G06F 8/61 |
| | | | 717/169 |
| 2016/0054989 A1* | 2/2016 | Diebolt | G06F 8/61 |
| | | | 717/177 |
| 2016/0117162 A1* | 4/2016 | Searle | H04L 41/082 |
| | | | 717/173 |
| 2016/0302070 A1* | 10/2016 | Yang | H04W 12/02 |
| 2016/0342409 A1* | 11/2016 | Acker | G06F 8/65 |
| 2016/0344705 A1* | 11/2016 | Stumpf | H04W 4/44 |
| 2016/0378457 A1* | 12/2016 | Adachi | G06F 11/00 |
| | | | 713/181 |
| 2017/0060559 A1* | 3/2017 | Ye | G06F 21/572 |
| 2017/0192770 A1* | 7/2017 | Ujiie | G06F 11/1433 |
| 2017/0331795 A1* | 11/2017 | Martin | H04L 63/0428 |
| 2018/0004953 A1* | 1/2018 | Smith, II | G06F 21/78 |
| 2018/0007040 A1* | 1/2018 | Thom | G06F 21/575 |
| 2018/0060608 A1* | 3/2018 | Holden | G06F 21/64 |
| 2018/0081669 A1* | 3/2018 | Becker | G06F 8/65 |
| 2018/0097639 A1* | 4/2018 | Gulati | H04L 9/3263 |
| 2018/0113704 A1* | 4/2018 | Schmidt | H04L 67/34 |
| 2018/0123804 A1* | 5/2018 | Smith | H04L 9/3213 |
| 2018/0145991 A1* | 5/2018 | McCauley | H04L 63/0428 |
| 2018/0152341 A1* | 5/2018 | Maeda et al. | |
| 2018/0183605 A1 | 6/2018 | Kawabata et al. | |
| 2018/0198629 A1* | 7/2018 | Deymonnaz | H04L 63/0823 |
| 2018/0217828 A1* | 8/2018 | Madrid | G06F 8/65 |
| 2019/0044709 A1* | 2/2019 | Fontana | H04L 9/088 |
| 2019/0156043 A1* | 5/2019 | Chhabra | H04L 9/0877 |
| 2020/0045544 A1* | 2/2020 | Yu | H04L 9/3247 |
| 2020/0057872 A1* | 2/2020 | Ingraham | H04L 9/3263 |
| 2020/0280439 A1* | 9/2020 | Nix | H04L 9/0894 |

OTHER PUBLICATIONS

Christopher King, Vehicle Cybersecurity: The Jeep Hack and Beyond, 2016, pp. 1-4. https://insights.sei.cmu.edu/blog/vehicle-cybersecurity-the-jeep-hack-and-beyond/ (Year: 2016).*

Dennis K. Nilsson, Secure Firmware Updates over the Air in Intelligent Vehicles, 2008, pp. 380-384. https://ieeexplore.ieee.org/stamp/stamp.jsp?tp=&arnumber=4531926&isnumber=4531848 (Year: 2008).*

International Searching Authority, International Search Report and Written Opinion of the International Searching Authority for International Application No. PCT/EP2018/062702, dated Jun. 29, 2018.

European Office Action, EP Application No. 18725197.0, dated Dec. 21, 2020.

* cited by examiner

METHOD AND SYSTEM FOR HARDWARE IDENTIFICATION AND SOFTWARE UPDATE CONTROL

FIELD OF THE DISCLOSURE

The present disclosure relates to software update management and component identification, and in particular relates to software update management and component identification in a secure manner.

BACKGROUND

Complex systems often contain multiple components from various vendors that, when combined, provide a very complex information technology (IT) infrastructure. For example, vehicles such as cars, trucks, ships, planes, among others, contain in their physical frame multiple components and sub-components from different manufacturers, which may each have an electronic control unit (ECU), information control unit (ICU), or other processing unit. This creates a very complex IT infrastructure based on the different hardware and software components from different vendors.

The various components within this complex system typically work together to achieve an end result. However, occasionally software or firmware within one or more of the components needs to be updated, either periodically or based on a request. Each component may have code written in different languages for different operating systems, and is typically provided by the manufacturer of the component. Thus, a system may require updates for a plurality of components from a plurality of different sources.

Further, occasionally components in a complex system need to be updated. For example, in a vehicle, components such as part of an antilock braking system (ABS) may need to be replaced in order to ensure the functionality, integrity and security of the antilock braking system, and thus the vehicle in general.

BRIEF DESCRIPTION OF THE DRAWINGS

The present disclosure will be better understood with reference to the drawings, in which.

DETAILED DESCRIPTION OF THE DRAWINGS

The present disclosure provides a method at a domain controller for software update control, the method comprising: receiving, at the domain controller, a software update package; verifying, at the domain controller, a source of the software update package; unbundling the software update package into at least one software update, each of the at least one software update being destined for a control unit managed by the domain controller; signing each of the at least one software update; and forwarding each signed software update to the control unit for which the software update is destined.

The present disclosure further provides a domain controller configured for software update control, the domain controller comprising: a processor; and a communications subsystem, wherein the domain controller is configured to: receive a software update package; verify a source of the software update package; unbundle the software update package into at least one software update, each of the at least one software update being destined for a control unit managed by the domain controller; sign each of the at least one software update; and forward each signed software update to the control unit for which the software update is destined.

The present disclosure further provides a computer readable medium for storing instruction code, which when executed by a processor of a domain controller cause the domain controller to: receive a software update package; verify a source of the software update package; unbundle the software update package into at least one software update, each of the at least one software update being destined for a control unit managed by the domain controller; sign each of the at least one software update; and forward each signed software update to the control unit for which the software update is destined.

The present disclosure further provides a method at a software update packager for software update control, the method comprising: maintaining, at the software update packager, a database having a plurality of domain controllers, where each domain controller is uniquely identified, along with a list of all control units managed by each domain controller and software version installed on each control unit; receiving at the software update packager, a software update; verifying a source of the software update; determining which of the plurality of domain controllers are affected by the software update; and adding the software update to a software update package for each of the affected domain controllers.

The present disclosure further provides a server having a software update packager for software update control, the server comprising: a processor; and a communication subsystem, wherein the server is configured to: maintain, at the software update packager, a database having a plurality of domain controllers, where each domain controller is uniquely identified, along with a list of all control units managed by each domain controller and software version installed on each control unit; receive at the software update packager, a software update; verify a source of the software update; determine which of the plurality of domain controllers are affected by the software update; and add the software update to a software update package for each of the affected domain controllers.

The present disclosure further provides a computer readable medium for storing instruction code, which when executed by a processor of a server having a software update packager, cause the server to: maintain, at the software update packager, a database having a plurality of domain controllers, where each domain controller is uniquely identified, along with a list of all control units managed by each domain controller and software version installed on each control unit; receive at the software update packager, a software update; verify a source of the software update; determine which of the plurality of domain controllers are affected by the software update; and add the software update to a software update package for each of the affected domain controllers.

The present disclosure further provides a method at a component under control of a domain controller, the method comprising: receiving, at the component, a software update, the software update being signed by the domain controller and encrypted by a source of the software update; verifying the signature of the domain controller; based on the verifying, unencrypting the software update; installing the software update; and reporting that the software update has been installed.

The present disclosure further provides a component under control of a domain controller, the component having a control unit comprising: a processor, and a communications subsystem, wherein the control unit is configured to: receive a software update, the software update being signed by the domain controller and encrypted by a source of the software update; verify the signature of the domain controller; based on the verification, unencrypt the software update; install the software update; and report that the software update has been installed.

The present disclosure further provides computer readable medium for storing instruction code, which when executed by a processor of a control unit within a component cause the control unit to: receive a software update, the software update being signed by the domain controller and encrypted by a source of the software update; verify the signature of the domain controller; based on the verification, unencrypt the software update; install the software update; and report that the software update has been installed.

The present disclosure provides for secure updates to components within a complex system, and further provides for the replacement of components within such complex system. The embodiments below are described with regard to a vehicle system. However, the use of the vehicle system is merely done for illustration and any system in which a plurality of components may need to be updated could equally benefit from the embodiments described herein. Therefore, the present disclosure is not limited to vehicle systems.

Vehicle systems typically have a very complex IT infrastructure based on different hardware components from different vendors. For example, embedded systems such as control units for autonomous drive, braking, infotainment, sensors such as oxygen sensors and pressure sensors, airbag controllers, stability control, among other software systems work inside the vehicle using a software controller.

While a lifecycle of a vehicle typically is between 10 and 20 years, the lifecycle for software is much shorter and updates need to be planned for to create added functionality and to extend features.

Further, security for software updates needs to be maintained to ensure the proper functioning of the components within the vehicle and the safety of the users of the vehicle. For example, hacker attacks need to be avoided to ensure malicious code does not affect the operation of the vehicles.

Also, components within a complex system occasionally need to be replaced. Thus, for example, an antilock braking system (ABS) may need to be replaced in a vehicle that has been involved with an accident. Typically, the component should be replaced with a compatible component to ensure user safety. Further, to avoid counterfeit or stolen components, a check may, in some embodiments described below, be made to ensure that the component being installed in the complex system is authentic.

Thus the embodiments described below provide for secure management of updates and component replacement.

Figure 1:
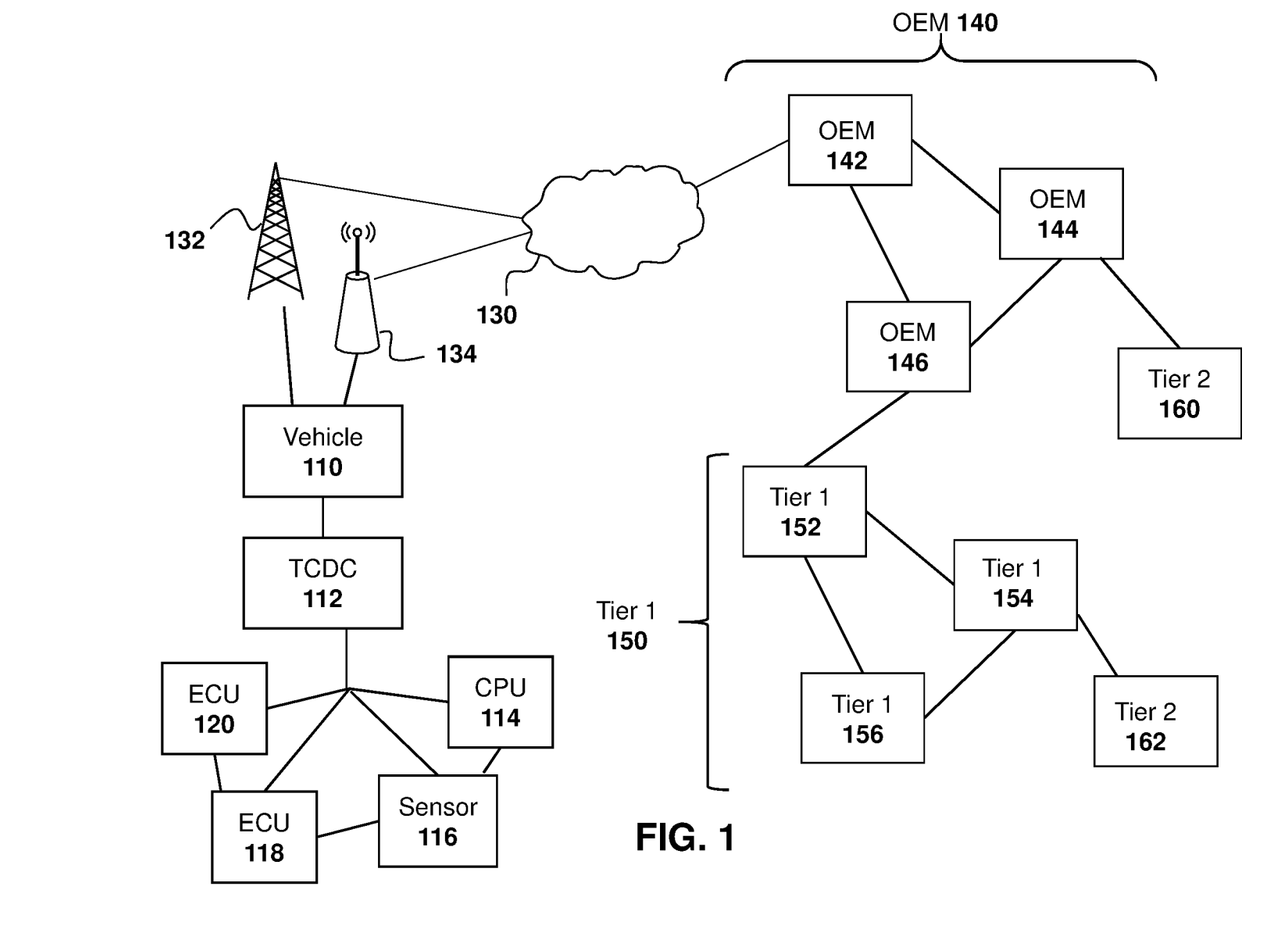
FIG. 1 is a block diagram showing an example architecture for a system in accordance with the embodiments of the present disclosure.

Reference is now made to FIG. 1, which shows an example architecture for a system in accordance with the embodiments described herein. In the example of FIG. 1, a vehicle 110 operates with a plurality of components from a plurality of manufacturers.

Vehicle 110 is equipped with a trusted car domain controller (TCDC) 112, which is a component described in more detail below. TCDC 112 is a trusted domain controller that generally provides for communication from the vehicle 110 to the world and provides an interface for the various IT infrastructure components within vehicle 110.

Thus, for example, in the embodiment of FIG. 1, TCDC 112 communicates with a central processing unit (CPU) 114, which may for example be a part of the infotainment system. TCDC 112 further communicates with a sensor 116, and ECU 118 and ECU 120. As will be appreciated by those skilled the art, the components within vehicle 110 are simplified in the example of FIG. 1, and a real-world embodiment would have many more components. The particular combination of sensors, CPUs and ECUs that the TCDC 112 communicates with in FIG. 1 is only provided for illustration.

Further, each of the CPU 114, sensor 116, ECU 118 and ECU 120 may communicate with each other, for example, through a bus such as a CANbus, or through other wired or wireless connections.

Each of CPU 114, sensor 116, ECU 118 and ECU 120 contains a computing unit which may have software or firmware that occasionally needs to be updated.

In accordance with the embodiment of FIG. 1, vehicle 110 may communicate through a network 130 to one or more servers. Network 130 may, for example, be any local or wide area network and can include the Internet.

Vehicle 110 may communicate through wireless methods, including cellular technology through a base station 132 or through wireless local area networks (WLAN) through access points 134, for example using communications technologies such as Wi-Fi, Bluetooth™, ZigBee, near field communications, among other options. In other embodiments, vehicle 110 may communicate using network 130 through wired technology, such as an Ethernet connection established when the vehicle is being serviced, through a communication connection when an electric vehicle is plugged into a charging station, through a data port at a user's home, among other options.

In the embodiment of FIG. 1, vehicle 110 may communicate with servers belonging to the original equipment manufacturer (OEM) 140. OEM 140 may, for example, be the vehicle manufacturer and vehicle 110 may communicate with any of OEM servers 142, 144 or 146.

The OEM 140 may, for example, be a car manufacturer, or a car brand manufacture. Thus, if a car manufacturer has a plurality of brands, each brand may be represented by its own OEM 140 backend.

Further, various suppliers may communicate with the OEM servers 140. For example, as illustrated in FIG. 1, tier 1 servers 150 may communicate with OEM 140. A tier 1 system may be a manufacturer that assembles a subsystem for a vehicle. For example, the antilock braking system may comprise a plurality of components which, when assembled, may then be provided to the vehicle manufacture. Thus, the tier 1 manufacturers may be those that assemble larger components of the vehicle.

Similarly, tier 2 manufacturers may provide components that go within some of the sub-systems or go directly into the vehicles. Thus, in the embodiment of FIG. 1, a server 160 representing a tier 2 manufacturer and server 162 representing a different tier 2 manufacturer may communicate with the various components within the embodiment of FIG. 1.

In other cases, more or less tiers of manufacturers may exist, and the present disclosure is not limited to any particular set of servers.

Figure 2:
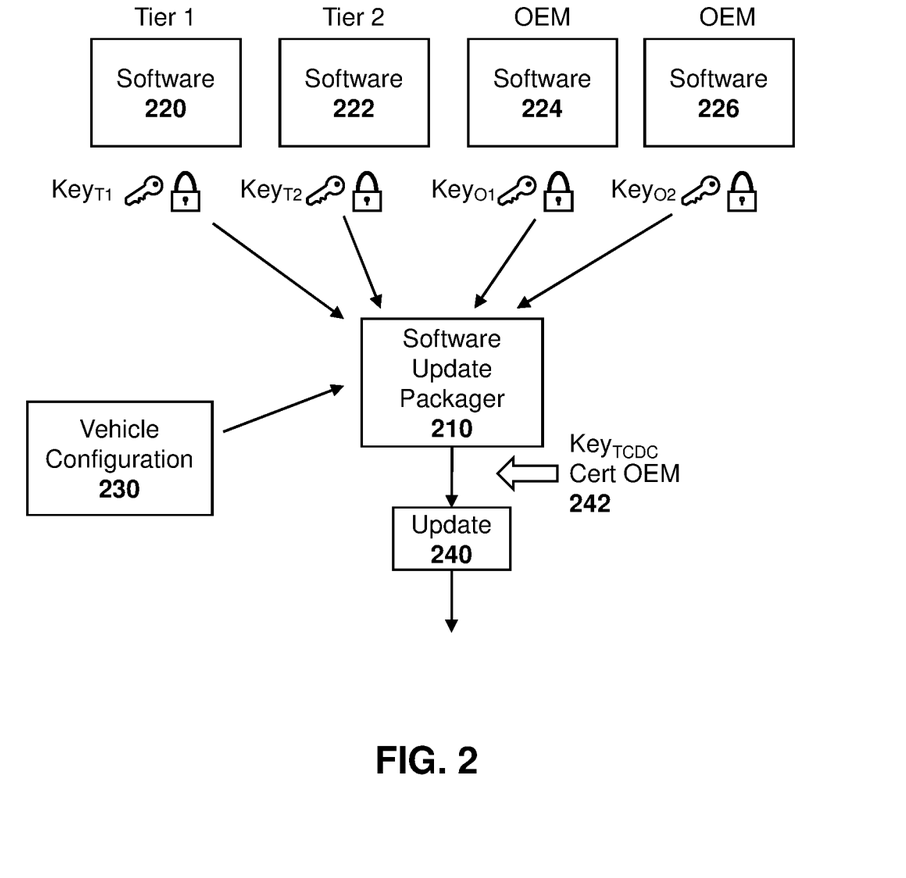
FIG. 2 is a block diagram showing components on a server for creating software update packages.

In accordance with one embodiments of the present disclosure, the OEM server 140 may include a software update packager. Reference is now made to FIG. 2, which shows network side functionality, including software update packager 210.

In the embodiment of FIG. 2, software update packager 210 may keep a database or list of a plurality of vehicles for which it is to provide updates. Such database or list may include a unique identifier for each vehicle, along with components or subsystems installed within each vehicle, and software versions installed for each component.

Not every vehicle is configured the same way. For example, some vehicles may have collision avoidance, navigation systems, antilock braking systems, lane departure warnings, different engines, different suspension systems, among other options. In many cases a vehicle manufacture may install systems but disable them in software if the consumer has not purchased that option. Therefore, software update packager 210 could maintain a list of vehicles in which each vehicle and its configuration is uniquely identified.

Software update packager 210 may further store software versions of the software and firmware installed on the various components on each vehicle.

When a new piece of software, such as software 220, is available from a tier 1 manufacturer, then it can be provided to software update packager 210. Upon arrival of software 220, software update packager 210 can determine which vehicles need the software update and create a package for that particular vehicle, as described in more detail below.

Similarly, software 222 from a tier 2 manufacturer may also arrive at software update packager 210 and software update packager 210 may make a determination of which vehicles need that software update.

In the embodiment of FIG. 2, software 224 from the OEM and software 226 from the OEM may also arrive at software update packager 210 and be placed within update packages for each vehicle that needs such software updates.

Before the software is placed into each update package, in accordance with one embodiment of the present disclosure the software update packager 210 may authenticate the provider of the software update. This may be done by verifying the signing certificate associated with the software update to ensure it was signed by the expected entity.

Further, in some embodiments, the signed update may be encrypted. Software update packager 210 would typically not decrypt the update, but would place the encrypted update in the software update package for each applicable vehicle.

A vehicle may periodically request its update package. In this case, the software update packager 210 may provide the update to the vehicle, as shown by block 240. The update may be encrypted using a key for the TCDC on the vehicle being updated. Further, a certificate for the software update packager or the OEM's signature may also be provided to ensure source validity. This is shown, for example, with arrow 242 in the embodiment of FIG. 2. The keys for each TCDC may, in some embodiments, be stored in a key store associated with the software update packager 210.

The vehicle configuration information stored at software update packager 210 may further be periodically updated. For example, when a new vehicle is manufactured, the vehicle and component information may be provided to the software update packager 210 for the creation of a new record in the database of software update packager 210. Further in other cases when parts are removed or swapped for other parts, such configuration update may also be provided to the software update packager 210. Updates are generally shown in the embodiment of FIG. 2 with block 230.

Figure 3:
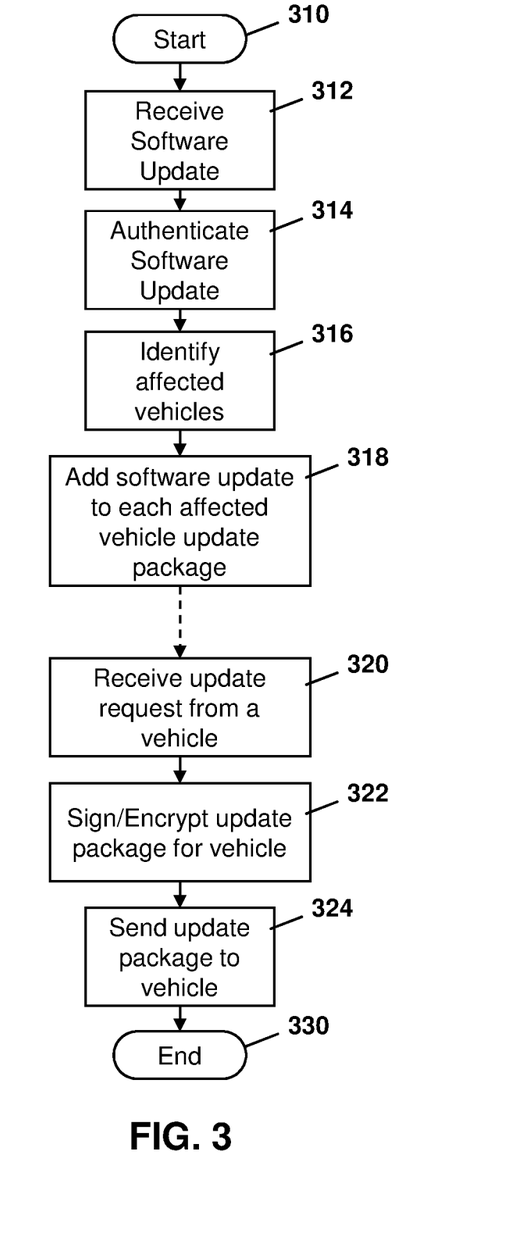
FIG. 3 is a process diagram showing an example process for creating a software update package.

Reference is now made to FIG. 3, which shows a process for the creation of a software update package. In the embodiment of FIG. 3 the process starts at block 310 and proceeds to block 312 in which a software update is received at the software update packager 210. As indicated above, the software update may be from a source associated with a component or subcomponent within the vehicle and may be signed or encrypted by such source. Therefore, the process of FIG. 3 proceeds to block 314 and authenticates the software update to ensure that it is coming from the authorized entity for such software update. This avoids cases where malicious code may be provided to the software update packager from unauthorized entities.

From block 314 the process proceeds to block 316 in which vehicles that are affected by the software update are identified. For example, all vehicles that have a navigation system from a particular manufacturer may be affected by the software update. Software update packager 210 thus identifies the various vehicles that it knows of that have such navigation system.

Once the affected vehicles are identified, the process proceeds to block 318 in which the software update is added to the affected vehicle's software update package.

Figure 4:
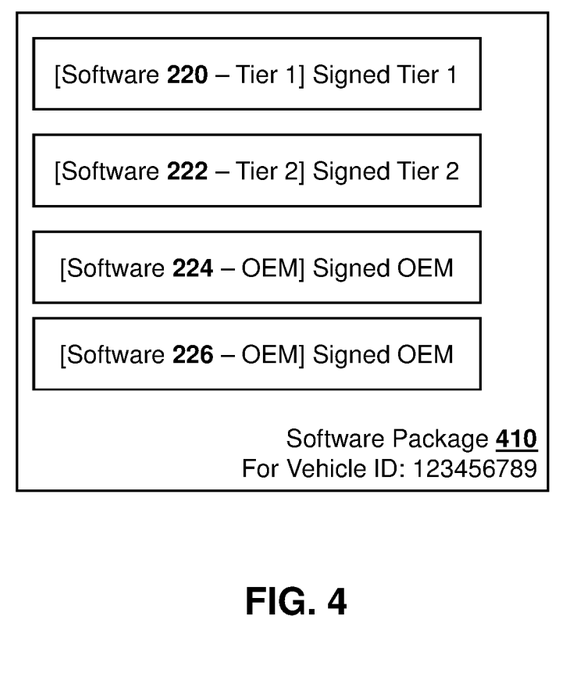
FIG. 4 is a block diagram showing an example software update package.

Reference is now made to FIG. 4 which shows an example software update package that may be stored at software update packager 210. Software package 410 is for a specific vehicle having an identifier and includes the various software updates that are accumulated for the vehicle. In the embodiment of FIG. 4, the four software updates shown in FIG. 2 are all relevant for the vehicle having ID 123456789 and therefore all four software packages are added to the update package.

As shown in FIG. 4, software 220, which is signed by a tier 1 manufacturer, software 222 which is signed by a tier 2 manufacturer, and software 224 and 226 which are each signed by the OEM, are stored within the software package 410.

Referring again to FIG. 3, at some point the software package 410 needs to be propagated to the vehicle 110. For example, the update may be pushed to the vehicle or pulled by the vehicle. The update is pulled based on a request from the TCDC 112 on vehicle 110. Pulling may be used in certain situations, such as for battery limited devices, where the radio of the device is not always listening for broadcasts. This could save battery life on the device. Conversely, push delivery would allow a radio that is listening to radio broadcasts to receive the update more quickly.

In the embodiment of FIG. 3, the software update is provided based on a request from a vehicle as shown at block 320.

Once the request is received, the software update packager 210 may optionally verify that the request is in fact from the specified vehicle. This may be done utilizing a certificate or a signature in the request itself.

Once the request is verified the process may proceed to block 322 in which the software package 410 is signed and/or encrypted and then the process proceeds to block 324 in which the update package that has been signed and/or encrypted is sent to the vehicle.

From block 324 the process proceeds to block 330 and ends.

As will be appreciated by those skilled in the art, the above builds software packages for a specific vehicle. It avoids unauthorized packages being sent to the vehicles and further minimizes the amount of software that is delivered to the vehicle. This may save both over the air resources for delivering such software update, as well as processing on the vehicle itself. The software update packager can use any vehicle identifier to uniquely identify each vehicle. For example, a vehicle identification number (VIN) may be the unique value for each vehicle.

FIG. 3 therefore provides an example process for the accumulation of software updates for a vehicle, where only updates that are relevant for the vehicle are provided in the update package.

A vehicle may periodically request the update. Such request may either specifically ask for the update, or may merely provide a notification to the backend server that the vehicle is ready to communicate. In this case, the server may know the configuration of the vehicle, the versions of the software installed on the vehicle, and thus would know exactly the updates that need to be delivered to the vehicle.

Figure 5:
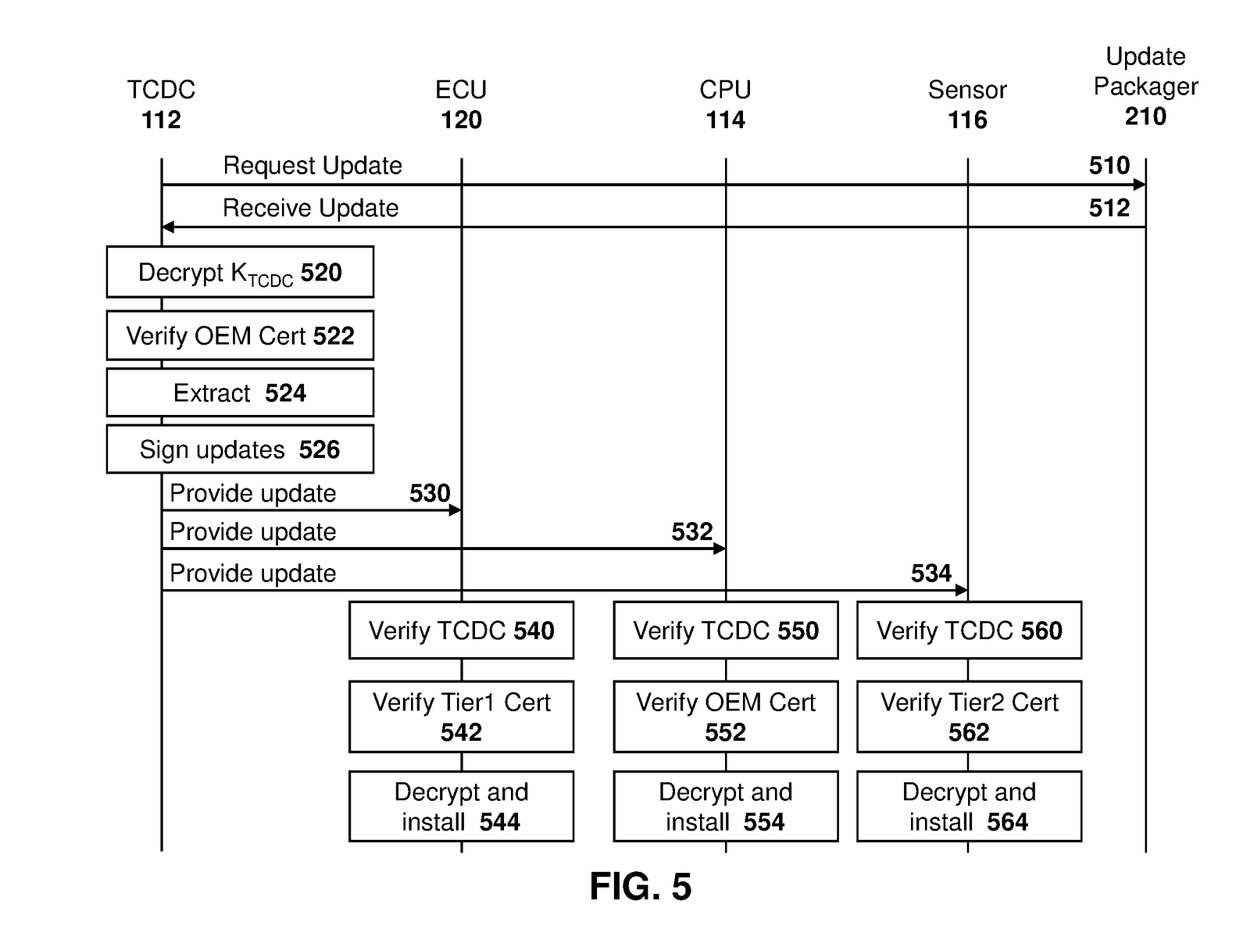
FIG. 5 is a dataflow diagram showing the process for updating a component on a vehicle.

Reference is made to FIG. 5, in which a TCDC 112 for a particular vehicle may initiate a request to an update packager 210 for an update package 410. Such request is shown by message 510 in the embodiment of FIG. 5. The update request may be made periodically from a vehicle. For example, it may be made once a week, once a month, every time the engine of the vehicle is started, among other time periods.

Once the request has been received and verified at the update packager 210, the update packager 210 may send an update package to TCDC 112, as shown by message 512 in the embodiment of FIG. 5.

TCDC 112 may then decrypt the package if it was encrypted at block 322. Such decryption is shown by block 520 in the embodiment of FIG. 5. Once decrypted, the TCDC 112 may verify that the update version is a newer version that it has previously received.

The TCDC 112 may then verify the certificate for the software update packager or OEM at block 522. As will be appreciated, in some embodiments the verification may be performed prior to the decryption.

Assuming that the package has been verified as being from the correct source, the various software updates for the vehicle may then be extracted at block 524.

In an alternative embodiment, rather than receiving the update package through a wired or wireless connection with the backend server, an update may be delivered to the TCDC 112 using a portable storage source such as a CD/DVD or USB stick. The storage source could be connected to the TCDC 112 and the update loaded to the TCDC in this way. The remainder of the method could function similarly to the above, with regard to the authentication of the source, the decryption of the update package.

Each individual software update may then be signed by the TCDC 112 at block 526. Such signing may be done to verify the TCDC is providing the package. Such verification may be needed because communications over a bus such as a CANbus are typically done in an unsecured manner. By sending the updates, the ECU, ICU, sensor or CPU of the various components or subcomponents know that the software update is coming from a legitimate source. This prevents malicious code or unauthorized software changes from being installed, for example by someone plugging directly into the CANbus and providing updates to the various components.

Once each software update is signed, the updates may be provided to the various components. In the example of FIG. 5, three components are provided with updates, specifically ECU 120, CPU 114 and sensor 116. The updates are provided in messages 530, 532 and 534 respectively.

Once the updates are received at each individual component, each individual component may perform similar functionality.

In particular, ECU 120, when it receives the update message 530, may verify the TCDC at block 540. This may involve verifying that the package is correctly signed by the TCDC. The ECU 120, when it was first installed, may be provided with information necessary to make such verification.

Once the TCDC is verified, the process may then proceed to block 542 in which the tier 1 certificate is verified. In particular, the tier 1 manufacturer may be the entity providing the update for the ECU 120 and in this case the verification at block 542 may ensure that the tier 1 certificate is valid in order to ensure that the update is coming from the correct source.

Once the TCDC is verified at block 540 and the tier 1 certificate is verified at block 542, the software update may then be decrypted and installed at the ECU 120, as shown at block 544.

Similarly, CPU 114 may receive the update at message 532 and verify the TCDC at block 550.

In the embodiment of FIG. 5, the update to CPU 114 comes from the OEM and therefore at block 552 the CPU 114 verifies the OEM certificate.

If both the TCDC and the OEM certificate are verified, then the CPU 114 may decrypt and install the software update at block 554.

For sensor 116, the update is provided in message 534 and sensor 116 may therefore verify the TCDC at block 560. In the embodiment of FIG. 5 the update comes from a tier 2 manufacturer and therefore the sensor 116 may verify the tier 2 certificate at block 562.

If both TCDC is verified at block 560 and the tier 2 certificate is verified at block 562 then the process may proceed to block 564 in which the update is decrypted and installed.

Once the software is successfully installed on the component, a verification message may be sent to the TCDC and the software update packager to provide that the update has been installed and allow the version of the software or firmware to be updated within these registers to ensure that future software updates can then be added correctly. In one embodiment, the verification message may be signed and encrypted by one or both of the component or the TCDC prior to being sent to the software update packager.

Utilizing the embodiments of FIGS. 2 to 5 above, software updates can be verified from the manufacturer all the way to the particular component on which it is installed. This ensures integrity of the software updates and prevents malicious code and unauthorized software from being provided to and installed on the various components of the vehicle.

In the embodiments described above, various keys and certificates may be used for decryption or verification. For example, public or private keys may be stored in key stores at the various components within the system above, and therefore may be accessed and used for verification or signing, encryption or decryption as needed. However, in other embodiments, a symmetric encryption may be utilized where a key for communication between two entities may be stored between those two entities and may be passed in a secure manner between such entities. Other examples are possible.

As provided above, the software update packager 210 and the TCDC 112 both need to know the components that are part of a vehicle 110. Such components may, for example, be registered with both the TCDC 112 and the software update packager 210 during vehicle manufacture.

Further, the component within each system or subsystem of the vehicle can be uniquely identified. This may include utilizing the manufacturer as well as a part number in combination, or distinguishing between the various components by assigning unique identifiers to different types of components, among other options.

In some cases, the component or subcomponent needs to be exchanged. For example, due to warranty, malfunction, maintenance or other reasons, the component or subcomponent may need to be replaced. In this case, if the component is being legitimately replaced, the registers within the TCDC and the software update packager needs to be updated to reflect the new component that is on the vehicle 110.

Figure 6:
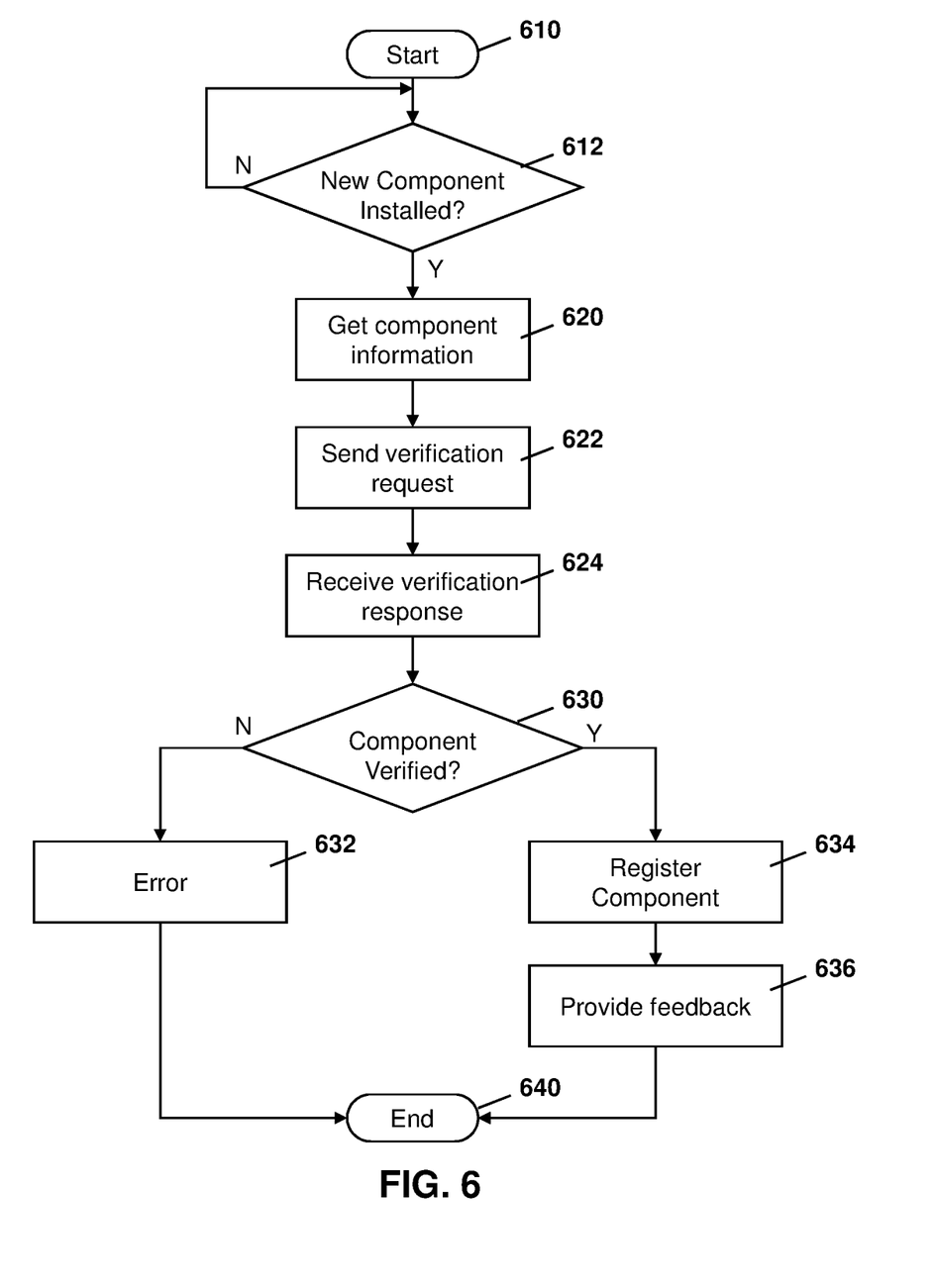
FIG. 6 is a process diagram showing an example process for installing a new component on a complex system.

Reference is now made to FIG. 6. FIG. 6 shows a vehicle-side process for the installation of a new component. In particular, the process starts at block 610 and proceeds to block 612 in which a check is made to determine whether a new component has been installed. The TCDC may know that a new component has been installed through various techniques. In one embodiment, the service center or garage that is installing the new component may further interface with the TCDC and provide updates to the component list within such TCDC. In other cases, the ICU or ECU may send messages to the TCDC and the TCDC may recognize that such messages are from a new component.

If, at block 612, no new component is installed, the process may loop back to block 612 until a new component is installed.

From block 612, once the component is installed, the process proceeds to block 620 in which component information is obtained. Such component information may include information such as a unique identifier, the component type, the manufacture of the component, among other information.

The process then proceeds from block 620 to block 622 in which a verification request is sent. The verification request may, for example, be sent to the backend of the OEM to verify that particular component.

The TCDC 112 may then receive a verification response as shown by block 624 and proceed to block 630 in which a check is made to determine whether the component is verified.

If, at block 630, it is determined that the component is illegitimate, the process proceeds to block 632 in which an error is created. For example, the component may be a counterfeit component and may not have the correct keys, or may be identified as incompatible with that particular vehicle, or has been registered as being stolen among other options. In this case, the error at block 632 may prevent the vehicle from functioning until the component is replaced.

In other cases, the component may be a legitimate component but may be stolen from a vehicle that was stripped for parts. In this case, the component would already be registered with a different vehicle and therefore the verification response may be provided which indicates that the component is invalid. This may result in a notification to law enforcement that the counterfeit component is being installed. Other options for errors are possible.

From block 632 the process proceeds to block 640 and ends.

Conversely, if the component is a legitimate component as found at block 630, then the process may proceed from block 630 to block 634 in which the component is registered. The registration of the component at block 634 may involve both registering the component at the TCDC 112 as well as the software update packager 210. Specifically, as shown at block 636, the TCDC may provide feedback to the network that the component was registered to allow the backend to update the list of components for the vehicle. The registration may involve key exchange to store the public key for the component at the TCDC 112 and the software update packager 210.

The exchange of keys may be done in a secure manner, for example by securing a channel utilizing some form of virtual private network or encryption mechanism such as the Diffie Hellman key exchange, among other options.

Once the component is registered and the keys stored in the various key stores, the process may proceed from block 636 to block 640 and end.

Figure 7:
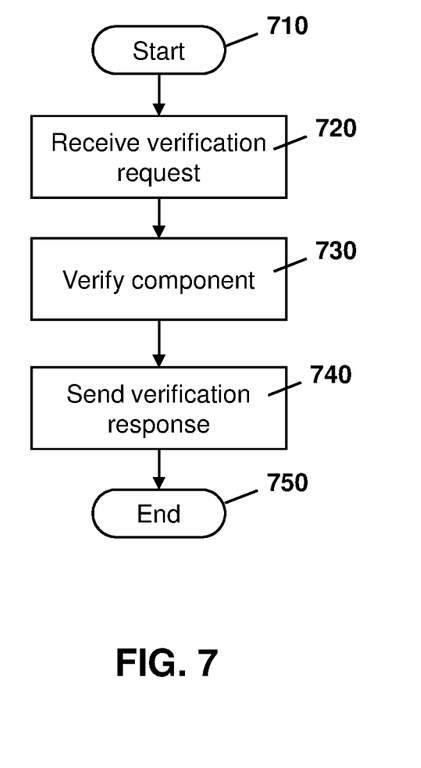
FIG. 7 is a process diagram showing an example process on a network for verifying a component.

On the network side, a process is provided having regard to FIG. 7. The process of FIG. 7 starts at block 710 and proceeds to block 720 in which a verification request is received. Such verification request may include component information, vehicle information, manufacturer information, among other information for a particular component.

The process then proceeds to block 730 in which the component is verified. This verification may indicate whether the component is a legitimate component, or whether it is counterfeit or stolen, for example. The verification may involve queries to other resources, including the manufacturer. Verification may further involve providing signatures or keys for such component.

Once the verification at block 730 is performed the process may proceed to block 740 in which a verification response indicating whether the component is a valid component or an invalid component may be provided back to the vehicle 110.

From block 740 the process proceeds to block 750 and ends.

Based on FIGS. 6 and 7, the domain controller and backend of the OEM may monitor the parts or components being installed on the vehicle to reduce use of counterfeit parts, incompatible parts, or stolen parts, for example.

The above may be implemented on any domain controller. An example domain controller is shown with regard to FIG. 8.

Figure 8:
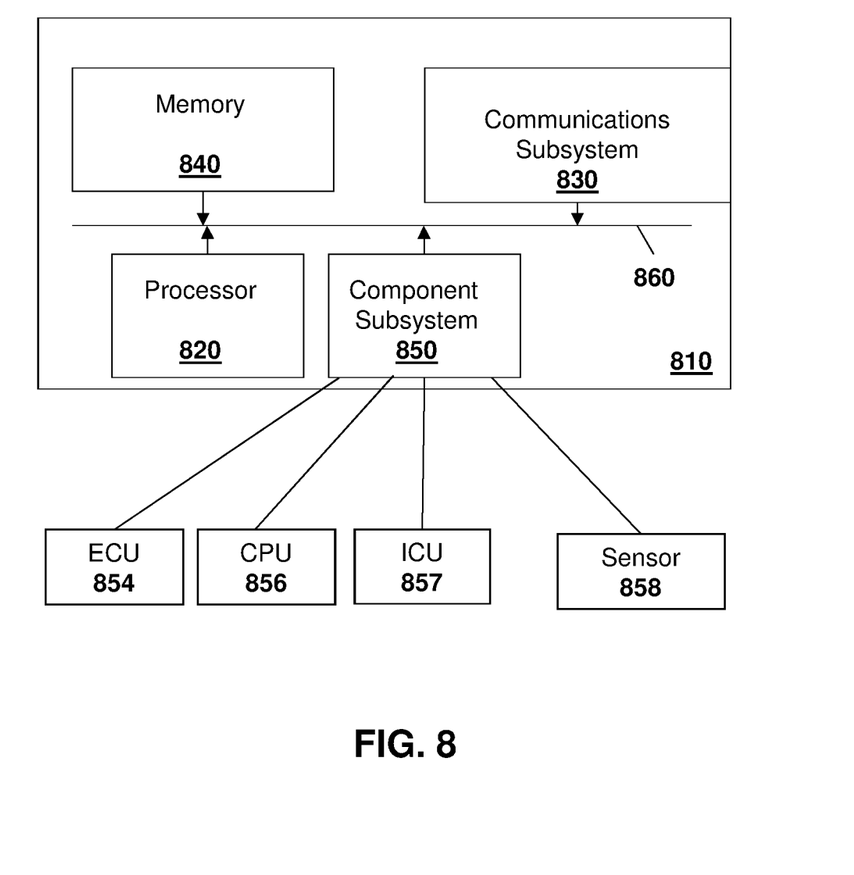
FIG. 8 is a block diagram of an example domain controller capable of being used in accordance with the embodiments of the present disclosure.

Referring to FIG. 8, an example domain controller 810 is provided. The domain controller can be any computing device, including but not limited to, an embedded computing device on a vehicle, a mobile device such as smartphones or cellular telephones, an internet of things device, an endpoint, a home automation devices, inventory tracking device, environmental monitoring devices, energy management device, infrastructure management device, vehicles or devices for vehicles, fixed electronic devices, among others.

Domain controller 810 comprises a processor 820 and at least one communications subsystem 830, where the processor 820 and communications subsystem 830 cooperate to perform the methods of the embodiments described herein.

Communications subsystem 830 may, in some embodiments, comprise multiple subsystems, for example for different radio technologies.

Communications subsystem 830 allows device 810 to communicate with other devices or network elements. Communications subsystem 830 may use one or more of a variety of communications types, including but not limited to cellular, satellite, Bluetooth™, Bluetooth™ Low Energy, Wi-Fi, wireless local area network (WLAN), near field communications (NFC), Zigbee, wired connections such as Ethernet or fiber, among other options.

As such, a communications subsystem 830 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 830 will be dependent upon the communication network or communication technology on which the image sensor apparatus is intended to operate.

Processor 820 generally controls the overall operation of the domain controller 810 and is configured to execute programmable logic, which may be stored, along with data, using memory 840. Memory 840 can be any tangible, non-transitory computer readable storage medium, including but not limited to optical (e.g., CD, DVD, etc.), magnetic (e.g., tape), flash drive, hard drive, or other memory known in the art. Memory 840 may further be used for key stores and to store component lists and software versions.

Alternatively, or in addition to memory 840, domain controller 810 may access data or programmable logic from an external storage medium, for example through communications subsystem 830.

In the embodiment of FIG. 8, domain controller 810 may communicate with a plurality of control units or processors. Such communication may be done through communication subsystem 830 or through a separate component subsystem 850.

Examples of components in the embodiment of FIG. 8 include a ECU 854, a CPU 856, an ICU 857, and sensor 858. However, the components shown in the embodiment of FIG. 8 are merely examples, and in other embodiments different components or sub-components may be used.

Communications between the various elements of domain controller 810 may be through an internal bus 860 in one embodiment. However, other forms of communication are possible.

Domain controller 810 may be affixed to any fixed or portable platform. For example, domain controller 810 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, domain controller 810 may be affixed to stationary objects that form complex systems.

Such domain controller 810 may be a power limited device. For example domain controller 810 could be a battery operated device within a vehicle. Other limited power sources could include any limited power supply, such as a small generator or dynamo, a fuel cell, solar power, among other options.

In other embodiments, domain controller 810 may utilize external power, for example from the engine of a vehicle, from a land power source for example on a plugged in recreational vehicle or from a building power supply, among other options.

Further, servers such as server 142, 144, 146, 152, 154, 156, 160, 162, or 210 may be any server. For example, one simplified server that may perform the embodiments described above is provided with regards to FIG. 9.

Figure 9:
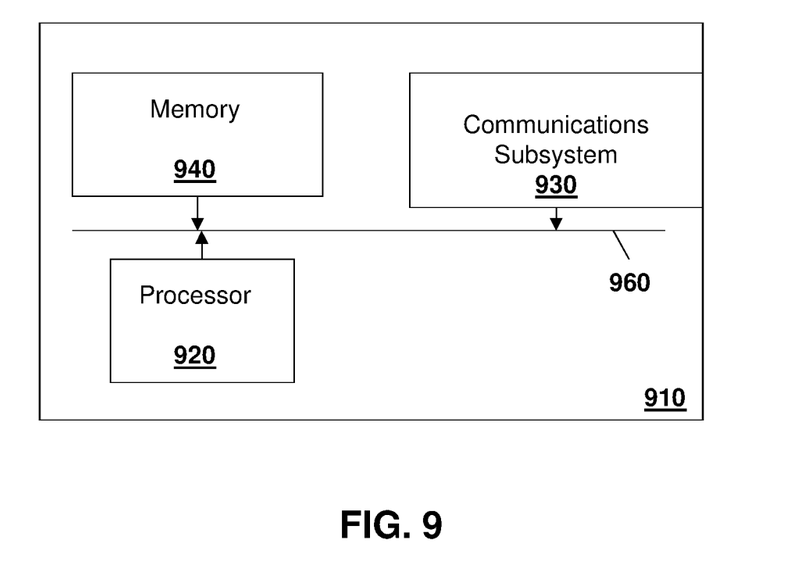
FIG. 9 is a block diagram of an example computing device capable of being used in accordance with the embodiments of the present disclosure.

In FIG. 9, server 910 includes a processor 920 and a communications subsystem 930, where the processor 920 and communications subsystem 930 cooperate to perform the methods of the embodiments described herein.

Processor 920 is configured to execute programmable logic, which may be stored, along with data, on server 910, and shown in the example of FIG. 9 as memory 940. Memory 940 can be any tangible, non-transitory computer readable storage medium, such as optical (e.g., CD, DVD, etc.), magnetic (e.g., tape), flash drive, hard drive, or other memory known in the art.

Alternatively, or in addition to memory 940, server 910 may access data or programmable logic from an external storage medium, for example through communications subsystem 930.

Communications subsystem 930 allows server 910 to communicate with other devices or network elements.

Communications between the various elements of server 910 may be through an internal bus 960 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

For example, other clauses could include:

AA. A method at a software update packager for software update control, the method comprising: maintaining, at the software update packager, a database having a plurality of domain controllers, where each domain controller is uniquely identified, along with a list of all control units managed by each domain controller and software version installed on each control unit; receiving at the software update packager, a software update; verifying a source of the software update; determining which of the plurality of domain controllers are affected by the software update; and adding the software update to a software update package for each of the affected domain controllers.

BB. The method of clause AA, wherein the plurality of domain controllers are each for a vehicle, and wherein each domain controller is identified using a Vehicle Identification Number.

CC. The method of clause AA, further comprising, receiving, from one of the plurality of domain controllers, a request for the software update package for such domain controller, the request being signed by such domain controller; verifying the signature of such domain controller; signing the software update package; and sending the software update package to such domain controller.

DD. The method of clause CC, further comprising retrieving a key from a key store for such domain controller, and encrypting the software update package using the key.

EE. A server having a software update packager for software update control, the server comprising: a processor; and a communication subsystem, wherein the server is configured to: maintain, at the software update packager, a database having a plurality of domain controllers, where each domain controller is uniquely identified, along with a list of all control units managed by each domain controller and software version installed on each control unit; receive at the software update packager, a software update; verify a source of the software update; determine which of the plurality of domain controllers are affected by the software update; and add the software update to a software update package for each of the affected domain controllers.

FF. The server of clause EE, wherein the plurality of domain controllers are each for a vehicle, and wherein each domain controller is identified using a Vehicle Identification Number.

GG. The server of clause EE, wherein the server is further configured to: receive, from one of the plurality of domain controllers, a request for the software update package for such domain controller, the request being signed by such domain controller; verify the signature of such domain controller; sign the software update package; and send the software update package to such domain controller.

HH. The server of clause GG, further comprising retrieving a key from a key store for such domain controller, and encrypting the software update package using the key.

II. A computer readable medium for storing instruction code, which when executed by a processor of a server having a software update packager, cause the server to: maintain, at the software update packager, a database having a plurality of domain controllers, where each domain controller is uniquely identified, along with a list of all control units managed by each domain controller and software version installed on each control unit; receive at the software update packager, a software update; verify a source of the software update; determine which of the plurality of domain controllers are affected by the software update; and add the software update to a software update package for each of the affected domain controllers.

JJ. A method at a component under control of a domain controller, the method comprising: receiving, at the component, a software update, the software update being signed by the domain controller and encrypted by a source of the software update; verifying the signature of the domain controller; based on the verifying, unencrypting the software update; installing the software update; and reporting that the software update has been installed.

KK. The method of clause JJ, wherein the component is a vehicle component, and wherein the domain controller is a trusted vehicle domain controller.

LL. The method of clause JJ, wherein the software update is encrypted using a public key of the component.

MM. The method of clause JJ, wherein the software update is encrypted with a symmetric key shared by the component and the source of the software update.

NN. A component under control of a domain controller, the component having a control unit comprising: a processor, and a communications subsystem, wherein the control unit is configured to: receive a software update, the software update being signed by the domain controller and encrypted by a source of the software update; verify the signature of the domain controller; based on the verification, unencrypt the software update; install the software update; and report that the software update has been installed.

OO. The component of clause NN, wherein the component is a vehicle component, and wherein the domain controller is a trusted vehicle domain controller.

PP. The component of clause NN, wherein the software update is encrypted using a public key of the component.

QQ. The component of clause NN, wherein the software update is encrypted with a symmetric key shared by the component and the source of the software update.

RR. A computer readable medium for storing instruction code, which when executed by a processor of a control unit within a component cause the control unit to: receive a software update, the software update being signed by the domain controller and encrypted by a source of the software update; verify the signature of the domain controller; based on the verification, unencrypt the software update; install the software update; and report that the software update has been installed.

The invention claimed is:

1. A method at a domain controller for software update control, the method comprising:
   maintaining, at the domain controller, a list of all control units managed by the domain controller, and a software version of software installed on each of the control units;
   receiving a request to add a control unit;
   verifying the request to add the control unit;
   based on the verifying, adding the control unit to the list of all control units;
   receiving, at the domain controller, a software update package from an update package server, the software update package being encrypted using a symmetric key shared between the domain controller and an original equipment manufacturer (OEM);
   verifying, at the domain controller, a source of the software update package, the verifying comprising checking that the software update package is associated with a certificate signed by the OEM;
   unbundling the software update package into at least one software update, each of the at least one software update being destined for a control unit in the list of all control units managed by the domain controller;
   signing each of the at least one software update with a cryptographic key associated to the domain controller; and
   forwarding each signed software update to the control unit for which the software update is destined, wherein each signed software update comprises a certificate of a software maker for verification by the control unit;
   wherein the domain controller is installed on a vehicle and manages the list of all control units; and
   wherein the update package server provides updates to the domain controller based on periodic requests by the domain controller.

2. The method of claim 1, wherein the unbundling comprises decrypting the software update package.

3. The method of claim 1, further comprising sending, prior to the receiving, a request for the software update package to the update package server, the request being signed by the domain controller.

4. The method of claim 1, wherein the verifying comprises sending the request to add the control unit to a server and receiving a response from the server.

5. The method of claim 1, further comprising:
   receiving confirmation that the at least one software update was installed; and
   forwarding the confirmation to a network element.

6. A domain controller configured for software update control, the domain controller comprising:
   a processor; and
   a communications subsystem,
   wherein the domain controller is configured to:
   maintain a list of all control units managed by the domain controller, and a software version of software installed on each of the control units;
   receive a request to add a control unit;
   verify the request to add the control unit;
   based on the verification, add the control unit to the list of all control units;
   receive a software update package from an update package server, the software update package being encrypted using a symmetric key shared between the domain controller and an original equipment manufacturer (OEM);
   verify a source of the software update package, the verifying comprising checking that the software update package is associated with a certificate signed by the OEM;
   unbundle the software update package into at least one software update, each of the at least one software update being destined for a control unit in the list of all control units managed by the domain controller;
   sign each of the at least one software update with a cryptographic key associated to the domain controller; and
   forward each signed software update to the control unit for which the software update is destined, wherein each signed software update comprises a certificate of a software maker for verification by the control unit;
   wherein the domain controller is installed on a vehicle and manages the list of all control units; and
   wherein the update package server provides updates to the domain controller based on periodic requests by the domain controller.

7. The domain controller of claim 6, wherein the unbundling comprises decrypting the software update package.

8. The domain controller of claim 6, wherein the domain controller is further configured to send, prior to the receiving, a request for the software update package to the update package server, the request being signed by the domain controller.

9. The domain controller of claim 6, wherein the domain controller is configured to verify by sending the request to add the control unit to a server and receiving a response from the server.

10. The domain controller of claim 6, wherein the domain controller is further configured to:
   receive confirmation that the at least one software update was installed; and
   forward the confirmation to a network element.

11. A non-transitory computer readable medium for storing instruction code, which when executed by a processor of a domain controller cause the domain controller to:
   maintain a list of all control units managed by the domain controller, and a software version of software installed on each of the control units;
   receive a request to add a control unit;
   verify the request to add the control unit;
   based on the verification, add the control unit to the list of all control units;
   receive a software update package from an update package server, the software update package being encrypted using a symmetric key shared between the domain controller and an original equipment manufacturer (OEM);
   verify a source of the software update package, the verifying comprising checking that the software update package is associated with a certificate signed by the OEM;
   unbundle the software update package into at least one software update, each of the at least one software update being destined for a control unit in the list of all control units managed by the domain controller;
   sign each of the at least one software update with a cryptographic key associated to the domain controller; and
   forward each signed software update to the control unit for which the software update is destined, wherein each signed software update comprises a certificate of a software maker for verification by the control unit;
   wherein the domain controller is installed on a vehicle and manages the list of all control units; and
   wherein the update package server provides updates to the domain controller based on periodic requests by the domain controller.

\* \* \* \* \*